United States Patent
Schultheis

[15] 3,644,071
[45] Feb. 22, 1972

[54] PUMP FLUID MOTOR WITH PRESSURIZED BEARING LUBRICATION SYSTEM

[72] Inventor: Stephen K. Schultheis, Tujunga, Calif.

[73] Assignee: The United States of America as represented by the Secretary of the Navy

[22] Filed: Nov. 18, 1970

[21] Appl. No.: 90,559

[52] U.S. Cl. ............................................. 418/83, 418/91
[51] Int. Cl. ................... F01c 21/04, F03c 3/00, F04c 29/02
[58] Field of Search ............................ 418/83, 87, 88, 91, 94

[56] References Cited

UNITED STATES PATENTS

| | | | |
|---|---|---|---|
| 2,257,349 | 9/1941 | Sherwood | 418/94 |
| 2,696,172 | 12/1954 | Compton | 418/83 |
| 3,133,506 | 5/1964 | Luciani | 418/91 |

Primary Examiner—Carlton R. Croyle
Assistant Examiner—John J. Vrablik
Attorney—Richard S. Sciascia and Ervin F. Johnston

[57] ABSTRACT

A pump fluid motor rotating impeller-type mechanism with pressurized bearing lubrication comprising: a body having an impeller cavity with an inlet and outlet, and an oil reservoir in communication with the cavity; a pair of hollow cylinder-type gear impellers mounted in the impeller cavity, the interior of each impeller being in communication with the oil reservoir; a pair of sleeve bearings rotatably mounting each impeller in the body for rotation in the cavity in an intermeshing relationship so as to be capable of transferring fluid between the inlet and the outlet; one end of each of the impeller sleeve bearings being in communication with the transferred fluid about the impellers and the other end of each of the impeller sleeve bearings being in communication with the oil reservoir; an O-ring sealing the rotary face of each sleeve bearing, and another O-ring sealing the stationary face of each sleeve bearing; a shaft; means sealably mounting the shaft in the body with one end interconnected to one of the gear impellers and the other end extending from the body into a low pressure environment; and pressure reducing means communicating the oil reservoir with the exterior of the body for pressure application.

7 Claims, 2 Drawing Figures

INVENTOR.
STEPHEN K. SCHULTHEIS,
BY    ERVIN F. JOHNSTON,
                ATTORNEY.

PUMP FLUID MOTOR WITH PRESSURIZED BEARING LUBRICATION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In some of the Navy's deep submersibles there is a requirement for pumping ambient sea water. In order to accomplish this purpose the inlet and outlet of the pump are exposed to the high pressure sea water environment and the power shaft of the pump extends into the deep submersible which is at a relative low pressure, such as one atmosphere. Since it is desirable that the bearings of such a pump be lubricated by oil there exists the problem of the tremendous pressure differentials between the sea water and the oil areas and/or between the oil areas and the low pressure environment within the deep submersible. In prior art pumps the pressure differentials have caused excessive wear on the seals between the sea water and low pressure environments. Also, the problem of maintenance of a long term bearing surface in the presence of a corrosive medium (sea water) has persisted. It would be highly desirable if this extreme pressure differential could be reduced, and at the same time a more favorable environment (a more highly lubricative environment) could be substituted for the sea water at the bearing surfaces. The obvious advantages of such a system are in providing longer pump life and a maintenance-free pump due to the elimination of internal corrosion. The same problem exists with fluid motors which operate under similar conditions wherein a fluid media, such as water, operates the motor to turn a power shaft within a low pressure environment.

SUMMARY OF THE INVENTION

The present invention provides a pump or fluid motor which optimizes the pressure differentials at the seals of the pump or motor where the seals interface the working fluid with the lubricating oil, and where the seals interface the lubricating oil with the low pressure environment. This has been accomplished by providing the pump or fluid motor with a body having an impeller cavity with an inlet and an outlet, and an oil reservoir in communication with the cavity; a pair of hollow cylinder-type gear impellers mounted in the impeller cavity, the interior of each impeller being in communication with the oil reservoir; a pair of sleeve bearings rotatably mounting each impeller in the body for rotation in the cavity in an intermeshing relationship so as to be capable of transferring fluid between the inlet and outlet; one end of each of the impeller sleeve bearings being in communication with the transferred fluid about the impellers and the other end of each of the impeller sleeve bearings being in communication with the oil reservoir; an O-ring sealing the rotary face of each sleeve bearing, and another O-ring sealing the stationary face of each sleeve bearing; a shaft; means sealably mounting the shaft in the body with one end interconnected to one of the gear impellers and the other end extending from the body into a low pressure environment; and pressure reducing means communicating the oil reservoir with the exterior of the body for pressure application. With such an arrangement the application of similar pressures at the fluid inlet and the pressure reducing means will result in less overall pressure differentials between the oil areas, fluid inlet, and the low pressure environment at the shaft end. When such an arrangement is applied to a deep submergence pump, which is mounted to a submersible, the pressure differentials at the seals between the ambient water and lubricating oil, and between the lubricating oil and the low pressure environment are minimized. In the preferred embodiment these pressure differentials are substantially equal.

STATEMENT OF THE OBJECTS OF THE INVENTION

An object of the present invention is to overcome the aforementioned problems associated with prior art pumps and fluid motors.

Another object is to provide a pump or fluid motor rotating impeller-type mechanism with pressurized bearing lubrication wherein the pressure differentials at the seals between the working fluid of the mechanism and the oil and between the oil and a low pressure environment at the shaft end of the machine are minimized.

Other objects and many of the attendant advantages of this invention will be readily appreciated as it becomes better understood by reference to the description and accompanying drawing which follows.

DESCRIPTION OF THE PREFERRED EMBODIMENTS

Figure 1:
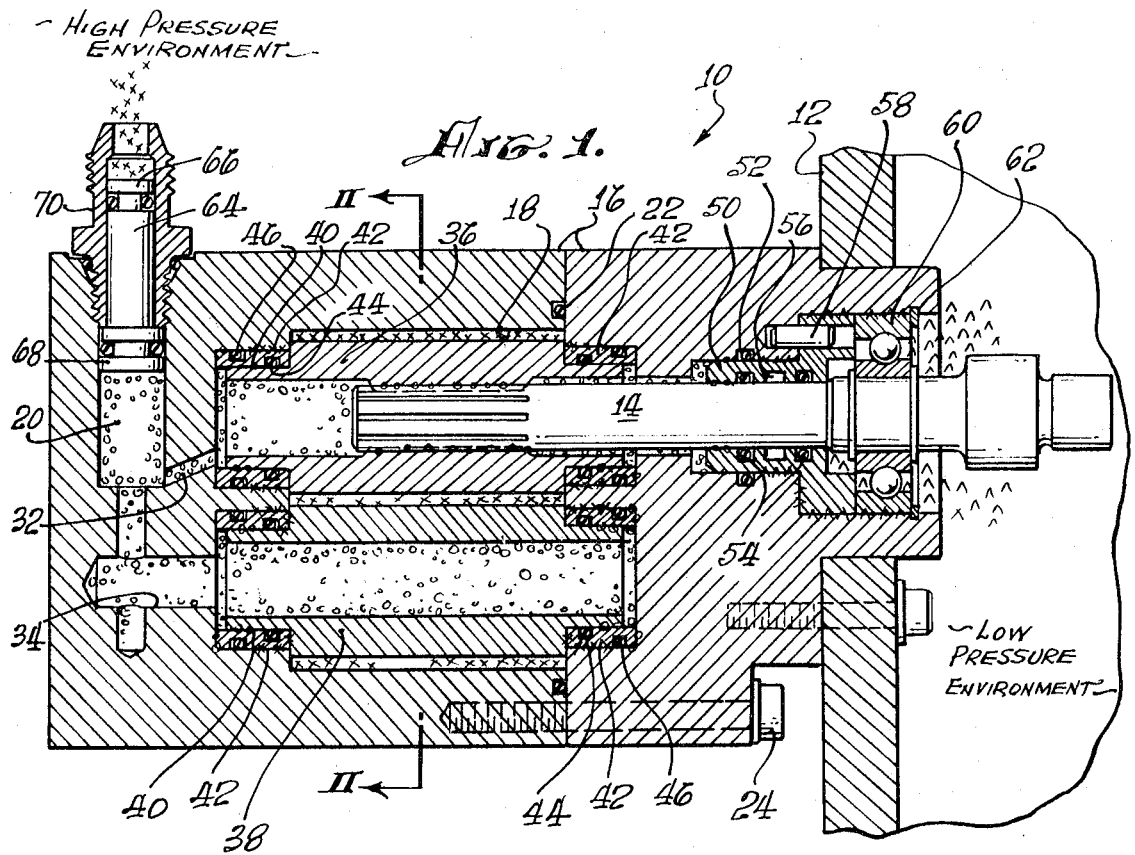
FIG. 1 is a longitudinal cross-sectional view of the pump or fluid motor with the areas of high pressure working fluid being shown with Xs, the oil areas being shown with Os, and the low pressure environment areas being shown with inverted Vs.

Referring now to the drawing wherein like reference numerals designate like or similar parts throughout the several views there is shown in FIG. 1 a rotating impeller-type mechanism 10, such as a pump or fluid motor, with pressurized bearing lubrication. For the purpose of making this description readily understandable the mechanism will be referred to as a pump, however, it is to be understood that the same structure could also be utilized as a fluid motor. The pump 10 may be mounted to a deep submersible 12 so that its power shaft 14 extends within a low pressure environment, such as one atmosphere, and the remainder of the pump is exposed to a high pressure environment such as sea water pressure.

Figure 2:
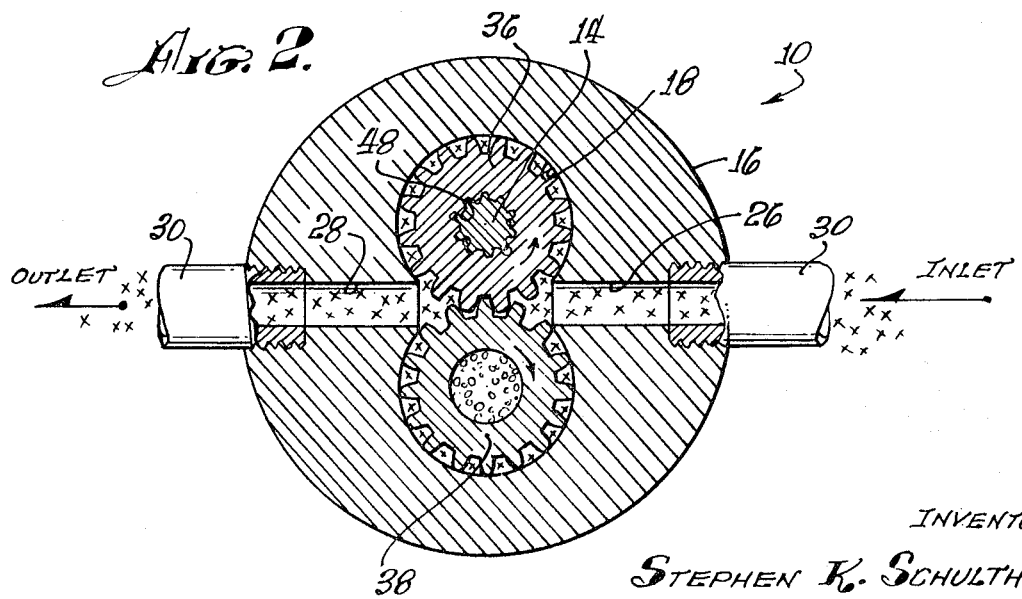
FIG. 2 is a view taken along plane II—II of FIG. 1.

As illustrated in FIGS. 1 and 2 the pump 10 includes a body 16 which has an impeller cavity 18 and an oil reservoir 20. As illustrated in FIG. 1 the pump body may be divided into two portions which are sealed by an O-ring 22 and connected together by bolts 24 (one bolt being illustrated in FIG. 1). As illustrated in FIG. 2 the pump body is provided with an inlet passageway 26 for communicating the working fluid, such as sea water, to the cavity 18, and an outlet passageway 28 for communicating the sea water to an area outside the pump body. These passageways may be provided with fittings 30 for delivering incoming sea water and outgoing sea water as desired. As illustrated in FIG. 1 the oil within the oil reservoir 20 may be channeled toward the cavity 18 by top and bottom passageways 32 and 34.

Mounted within the impeller cavity 18 is a pair of hollow cylinder-type gear impellers 36 and 38. The interior of each impeller is in communication with the reservoir 20 through the passageways 32 and 34 resulting in a filling of the impeller interiors by lubricating oil.

Each impeller 36 and 38 may be provided with a pair of reduced diameter bearing ends 40. A pair of sleeve bearings 42 may rotatably mount each impeller at its bearing ends in the body 16 so that the impellers will rotate in the cavity 18 in an intermeshing relationship. With such an arrangement the impellers are capable of transferring fluid between the inlet 26 and the outlet 28.

As illustrated in FIG. 1 one end of each of the impeller sleeve bearings 42 is exposed to the sea water pressure about the impellers, and the other end of each of the impeller sleeve bearings is exposed to the oil pressure from the oil reservoir 20. An O-ring 44 may be utilized for sealing the rotary face of each sleeve bearing 42, and another O-ring 46 may be utilized for sealing the stationary face of each of these sleeve bearings. As illustrated in FIG. 1 it is desirable that the O-rings 44 be located as close as possible to the sea pressure ends of the sleeves 42 so that a maximum of each rotary face thereof is lubricated by oil.

The top impeller 36 may be provided with internal splines 48 so that an inner splined end of the shaft 14 can be connected thereto. The outer end of the shaft 14 may extend to a low pressure environment within the submersible 12, and may be powered by a prime mover therein for rotating the impellers 36 and 38 and enabling pump operation.

In the arrangement just described, a means is provided for sealably mounting the power shaft 14 in the pump body 16. The means sealably mounting the power shaft 14 in the pump body 16 may include a sleeve bushing 50 which is sealed at its outer surface by an O-ring 52 and is sealed at its inner surface by O-rings 54. Only one O-ring 54 is essential, however, these double O-rings enable a pressure lubricating backup seal 56 which is located therebetween. The O-rings 52 and 54 provide a seal between the oil pressure and low pressure environments. The bushing 50 may be retained in place by a pin 58 which extends within the pump body 16. The bushing 50 could serve as a bearing for the power shaft 14, however, it is more desirable to utilize a roller bearing 60 which is journaled within the pump body. This bearing may be fixed in place by retainer rings 62.

In order to accomplish the most desirable pressure differentials between the sea water pressure and the oil pressure, and between the oil pressure and the low pressure environment a pressure reducing means is utilized for communicating the oil reservoir with the outside pressure environment which may be sea water pressure. The pressure reducing means may include a piston 64 which has a top end 66 exposed to the outside sea water pressure, and a bottom end 68 which is exposed to oil pressure within the reservoir 20. The piston 64 may be slidably mounted within a fitting 70 which is threaded into the pump body 16 in communication with the oil reservoir. The outer end of the fitting 70 may be provided with threads for connection to an external pressure source when it is desired to communicate the fitting with a pressure other than ambient. When the opening of the fitting 70 is exposed to ambient sea water pressure, which is the same as the pressure within the impeller cavity 18, it is desirable that the effective area of the bottom 68 of the piston member 64 be twice the effective area of the top 66 thereof. This brings about the highly desirable result the pressure differential between sea pressure and oil pressure being approximately equal to the pressure differential between oil pressure and the low pressure environment. Depending upon the particular sealing configuration the ratio of the areas of piston surfaces 68 to 66 may be other than 2 to 1 so as to optimize a seal-wear rate.

As stated hereinabove the description for the pump 10 also applies to a fluid motor. When the mechanism 10 is utilized as a fluid motor, pressurized fluid, such as water, is forced into the inlet passageway 26 and this causes the impellers 36 and 38 to rotate with the water exiting through the outlet passageway 28. This causes the power shaft 14 to rotate so that it can be utilized for delivering power as desired. Further, the concept of the invention is broad enough to utilize the mechanism 10, whether it be a pump or fluid motor, in an environment other than a submerged sea water condition. For instance, when utilized at the earth's surface in a one atmosphere environment, a high pressure fluid may be applied to the inlet passageway 26 in which case a fluid pressure would also be applied to the fitting 70. The effective areas of the piston ends 66 and 68 would be then designed so that substantially the same pressure differentials would exist between the working fluid on the inlet side and the oil on one hand, and the oil and the environment about the exterior of the shaft 14 on the other hand.

It is now readily apparent that the present invention provides a novel pump or fluid motor which has a very desirable pressure relationship between its working fluid, oil pressure, and a lower pressure environment. The present invention has particular usefulness for pumps which are mounted to deep submersibles for pumping sea water. As the pump is taken to various depths by the deep submersible the desired pressure differentials are maintained in a substantially constant ratio.

Obviously many modifications and variations of the present invention are possible in the light of the above teachings. It is therefore to be understood that within the scope of the appended claims the invention may be practiced otherwise than as specifically described.

I claim:

1. A pump/motor rotating impeller-type machine with pressurized bearing lubrication comprising:

a body having an impeller cavity with an inlet and an outlet, and an oil reservoir in communication with said cavity;

a pair of hollow cylinder-type gear impellers mounted in the impeller cavity, the interior of each impeller being in communication with the oil reservoir;

a pair of sleeve bearings rotatably mounting each impeller in the body for rotation in the cavity in an intermeshing relationship so as to be capable of transferring fluid between the inlet and outlet;

one end of each of the impeller sleeve bearings being exposed to the transferred fluid about the impellers and the other end of each of the impeller sleeve bearings being exposed to oil of the reservoir;

an O-ring sealing the rotary face of each sleeve bearing, and another O-ring sealing the stationary face of each sleeve bearing;

a shaft;

means sealably mounting the shaft in the body with one end interconnected to one of the gear impellers and the other end extending from the body into a low pressure environment; and pressure reducing means communicating the oil reservoir with the exterior of the body for pressure application;

whereby application of similar pressures at the fluid inlet and the pressure reducing means will result in less overall pressure differentials between the oil pressure, inlet fluid pressure, and the low pressure environment at the shaft end.

2. A combination as claimed in claim 1 including:

the pressure reducing means comprising piston means for establishing a substantially equal pressure differential drop between the exterior pressure application and the oil reservoir, and the oil reservoir and said low pressure environment.

3. A combination as claimed in claim 1 including:

the O-ring sealing the rotary face of each sleeve bearing being located near the working fluid pressure ends of the sleeves so that a maximum for each rotary face is lubricated by oil.

4. A combination as claimed in claim 1 including:

the means sealably mounting the shaft in the body comprising a sleeve bushing and O-rings sealing both sides of the bushing between the oil pressure at the interior of gear impeller and said low pressure environment.

5. A combination as claimed in claim 4 including:

the pressure reducing means comprising piston means for establishing a substantially equal pressure differential drop between the exterior pressure application and the oil reservoir, and the oil reservoir and said low pressure environment.

6. A combination as claimed in claim 5 including:

the O-ring sealing the rotary face of each sleeve bearing being located near the working fluid pressure ends of the sleeves so that a maximum of each rotary face is lubricated by oil.

7. A deep submersible sea water pump comprising:

a pump body having an impeller cavity with an inlet and an outlet, and an oil reservoir in communication with said cavity;

a pair of hollow cylinder-type gear impellers mounted in the impeller cavity, the interior of each impeller being in communication with the oil reservoir;

a pair of sleeve bearings rotatably mounting each impeller in the pump body for rotation in the cavity in an intermeshing relationship so as to be capable of pumping sea water between the inlet and outlet;

one end of each of the impeller sleeve bearings being in communication with sea water pressure about the impellers and the other end of each of the impeller sleeve bearings being in communication with the oil reservoir;

an O-ring sealing the rotary face of each sleeve bearing at a location near the sea water pressure end of the bearings and another O-ring sealing the stationary face of each sleeve bearing;

a shaft;

a sleeve bushing rotatably sealing the shaft in the pump body so that one end of the shaft is interconnected to the interior of one of the gear impellers and the other end is adapted for exposure to a low pressure environment;

O-rings sealing both sides of the shaft bushing between the oil reservoir pressure at the interior of the interconnected gear impeller and said low pressure environment; and piston means pressure communicating the oil reservoir with ambient sea water for establishing a substantially equal pressure differential drop between ambient sea water and the oil reservoir, and the oil reservoir and said low pressure environment.

* * * * *